Figure 1:
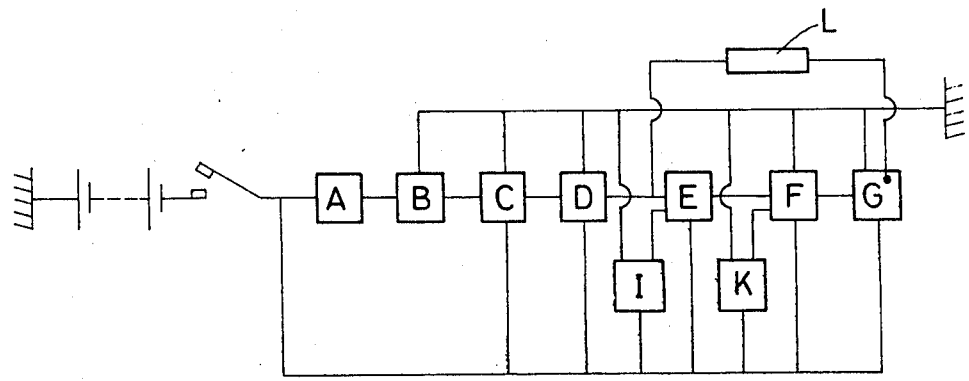

United States Patent [19]

Habert

[11] 3,967,603

[45] July 6, 1976

[54] SPEED SENSITIVE SWITCHING DEVICE

[76] Inventor: Roger Jean Habert, 73 Avenue de la Republique, 93800 Epinay-sur-Seine, France

[22] Filed: May 16, 1974

[21] Appl. No.: 470,439

[30] Foreign Application Priority Data

May 22, 1973 France .............................. 73.18511

[52] U.S. Cl. ............................... 123/118; 123/102; 324/169; 307/96
[51] Int. Cl.$^2$ ......................... F02P 9/00; F02P 1/00
[58] Field of Search .................... 123/102, 118, 198; 324/169; 307/96, 97

[56] References Cited

UNITED STATES PATENTS

| | | | |
|---|---|---|---|
| 3,736,910 | 5/1973 | Raff .................................... | 123/102 |
| 3,750,633 | 8/1973 | Ohtani ................................ | 123/102 |
| 3,766,895 | 10/1973 | Voss .................................... | 123/102 |
| 3,776,204 | 12/1973 | Harris .................................. | 123/118 |
| 3,822,679 | 7/1974 | Hobo ................................... | 123/102 |

*Primary Examiner*—Charles J. Myhre
*Assistant Examiner*—Ronald B. Cox

[57] ABSTRACT

This invention provides a speed sensitive device for controlling the speed of an engine. A tachometric generator is provided which supplies a voltage or a function of the engine speed, and this is compared with a reference voltage which is a fraction of the voltage of the battery.

In a first stage of the comparison the voltage supplied by the tachometric generator is compared with a reference voltage fixed by a dividing bridge, which determines a comparison threshold so that, when the voltage supplied by the tachometric generator exceeds this threshold, the first stage triggers a second stage of comparison, similar to the first, which compares the voltage from the first stage with another reference voltage fixed by a second dividing bridge, this second triggering causing actuation of a switching component to modify the ignition of the engine.

7 Claims, 2 Drawing Figures

SPEED SENSITIVE SWITCHING DEVICE

The present invention relates to a switching device sensitive to the speed of rotation of an engine, principally of an internal combustion engine for motor vehicles. Such a device is particularly useful for inclusion in the spark ignition circuit of an engine, for limiting the speed thereof under certain predetermined conditions.

Devices for limiting the speed of an internal combustion engine beyond a critical threshold are known, in which the high voltage provided by the secondary winding of the ignition coil is shunted to earth when the engine operates beyond predetermined normal running conditions. These devices have the disadvantage of being unreliable because the voltage necessary to cause sparks in the sparking plug is variable as a function of the internal pressure in the cylinders of the engine, of the state of the plugs and of atmospheric conditions.

Other devices for limiting speed consist in using multi-vibrators which are monostable at uniform time intervals, and which, when the engine operates beyond said determined conditions, short-circuits a signal which controls the spark, thus suppressing the ignition of the engine. These devices are accurate, but the cutting out of the motor which is thus obtained is abrupt, and their cost is high.

An object of the present invention is to provide a device for limiting the speed of an engine in which these disadvantages are minimised or avoided.

According to the invention, a speed sensitive switching device for controlling the speed of rotation of an engine comprises a tachometric generator which supplies a voltage which is a function of the speed of the engine, a comparator which compares the voltage supplied by the tachometric generator with a reference voltage which is a fraction of the voltage of the battery, and a switching component, the comparator having a first stage of comparison which compares the voltage supplied by the tachometric generator with a reference voltage fixed by a dividing bridge and which determines a comparison threshold, in such a way that, when the voltage supplied by the tachometric generator exceeds this threshold, the first stage triggers a second stage of comparison, similar to the first, which compares the voltage from the first stage with another reference voltage fixed by a second dividing bridge, this triggering causing triggering of the switching component, which then conditions a dipole, connected in parallel between the switching component and the first stage, to take a part of the voltage from the switching component and to return it to the first stage of comparison in such a way as to cause the response of this first stage, and thus of the whole of the device, to vary.

Figure 2:
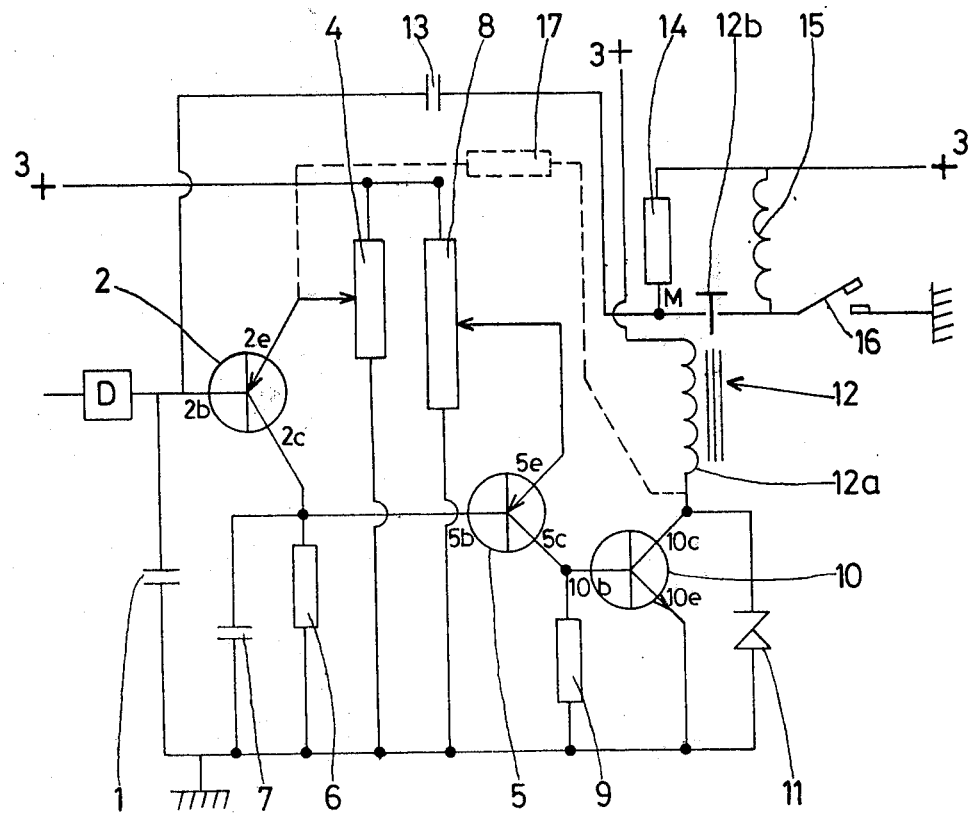

The invention will now be described, by way of example, with reference to the accompanying drawings in which:

FIG. 1 is a diagrammatic representation of the speed limitor of the invention, and FIG. 2 shows the comparison assembly with which the switch is associated, such as a relay.

Referring to FIG. 1, this shows the known elements, such as a signal generator A, which may be either a part of the gearbox of a vehicle to which the device is fitted, or any other component whose movement is a function of the speed of the vehicle or of the engine. These signals are then filtered by a filter B, then shaped by a shaping circuit represented by the block C, the signals thus obtained then being treated by a tachometric generator D, such as a diode pump, which thus supplies a voltage approximately proportional to the speed to be detected; this voltage is then compared, in an approximate manner by a first stage of comparison constituted by a comparator E and a dividing bridge I, with the fraction of the voltage of the battery determined by a dividing bridge I.

According to the invention, the voltage from this first stage supplies a second stage of comparison constituted by a comparator E and a dividing bridge K, which dividing bridge determines a threshold which ensures that when the voltage from the first stage reaches this threshold, a switching component G cuts the ignition circuit of the internal combustion engine.

Further according to the invention, a condensor L, connected in parallel between an element of the switch G and the input of the first stage of comparison (E and I) causes the voltage supplying the first stage to vary when the threshold determined by the dividing bridge I is reached, so as to progressively suppress the ignition sparks.

The operation of the invention is explained in more detail in FIG. 2.

In fact, the more or less d.c. voltage, which is a function of the speed to be detected, from the tachometric generator D, is filtered by the condenser I in order to supply the base $2b$ of a transistor 2, of the p.n.p. type, constituting the comparator E, of the diagram of FIG. 1, with a voltage having the lowest possible ripple. The emitter $2e$ of this same transistor is supplied by the battery 3 through a dividing bridge 4 connected between the positive pole of the battery and earth. A resistance 6 is charged by the transistor 2 causing blocking of a transistor 5.

A condensor 7 filters the residual ripple amplified by the transistor 2, for supplying the base $2b$ of the transistor 2. The voltage supplying the base $5b$ of the transistor 5 thus has a minimum ripple and the response of this transistor is then very precise.

The emitter $5e$ of this transistor is itself also supplied by the battery 3 through a dividing bridge 8 connected between the positive pole of the battery and earth. The resistance 9 enables the base potential of the transistor 10 to be fixed when the transistor 5 is cut-off. The collector $5c$ of the transistor 5 supplies the switching component, comprising an amplifying transistor 10 of the n-p-n type, a protective Zener diode 11 and a relay 12. The collector $5c$ supplies the base of a transistor 10, the emitter $10e$ of this latter being connected to earth, its collector $10c$ permitting voltage to be fed to one end of the winding $12a$ of the relay 12, this winding being subjected, at its other end, to the voltage of the battery.

The blade $12b$ of the relay 12 is connected in series with a resistance 14 between the two terminals of the primary 15 of the ignition coil. The primary 15 is connected to the positive pole of the battery and to the contact breaker 16, this latter being finally connected to earth.

A condensor 13 is connected between the resistance 14 and the blade $12b$, and to the base $2b$ of the transistor 2, in order to store the differences in potential created at the blade $12b$ during the opening and closing movements of this blade, and to apply them to the base $2b$ of the transistor 2.

When the speed in question is lower than the predetermined limit speed, the blade $12b$ is open, allowing the ignition circuit to operate normally. Under low speed conditions, the potential of the base 2b is less than that of the emitter 2e, and the transistor 2 is then conducting and supplies the resistance 6 which cuts off the transistor 5. Consequently the transistor 10 under these conditions, does not supply the winding 12a of the relay 12. This winding is connected only to the potential of the battery 3, leaving the blade 12b open. The condensor 13 then plays no part.

When the speed approaches the limit speed, the potential of the base 2b increases and cuts off the transistor 2, the potential of the base 5b suddenly decreases and the transistor 5 which itself also becomes conducting, supplying the base 10b of the transistor 10, which itself also becomes conducting, and subjects the winding of the relay to an excitation current causing the attraction of the blade 12b and the closure of the contacts of the relay. The primary 15 of the ignition coil is then short-circuited by the resistance 14 and the potential created by the opening of the contact breaker 16 is clearly insufficient to cause sparks in the sparking plugs.

With the contact breaker 16 closed, when the blade 12b closes, the potential of the point M is suddenly lowered, the condensor 13 stores a part of the potential and applies it as a negative potential to the base 2b of the transistor 2; this latter then becomes conducting and cuts off the remainder of the device causing the opening of the blade 12b so that, for a very short time the ignition circuit is restored. When the potential of 2b necessary to cut off the transistor 2 is again reached, which happens instantaneously with the opening of the blade, the process recommences, creating a vibratory condition of the blade of the relay, which progressively cuts the ignition.

The vibrations of the blade thus obtained are controlled and the device of the invention is thus suitable for use with any relay.

It is clear that many modifications may be made to the present embodiment without exceeding the scope of the invention; according to the conditions, it may be preferable to place a resistance 17 (broken line, FIG. 2) in parallel between the collector of the transistor 10 and the emitter of the transistor 2, which, by modifying the potential of the emitter 2e, causes a sharp cut off and a hysteresis effect. It is possible to replace the switching component G comprising the transistor 10 and the relay 12, by a single power transistor. It should be noticed that such a device may be used to detect speed, the resistance 17 and the condensor 13 being omitted.

I claim:

1. A speed sensitive switching device for controlling the speed of rotation of an engine, comprising: a tachometric generator for supplying a voltage which is a function of the speed of the engine, a comparator connected to said generator and a battery for comparing the voltage supplied by the tachometric generator with a reference voltage which is a fraction of the voltage of the battery, a switching component, a first and a second dividing bridge, the comparator having a first and second stage of comparison, said first stage comparing the voltage supplied by the tachometric generator with a reference voltage fixed by said first dividing bridge and determining a comparison threshold, in such a way that, when the voltage supplied by the tachometric generator exceeds this threshold, the first stage triggers said second stage of comparison for comparing the voltage from the first stage with another reference voltage fixed by said second dividing bridge, to thereby cause triggering of said switching component, and a dipole, connected in parallel between said switching component and said first stage and conditioned thereby upon triggering of said switching component to take a part of the voltage from the switching component and to return it to said first stage of comparison in such a way as to cause the response of this first stage and thereby of the whole of the device to vary.

2. A device according to claim 1 wherein the switching component includes a relay and a voltage amplifier, for increasing the voltage at the output of the second stage, so as to provide a sufficient potential to activate the relay.

3. A device according to claim 1, wherein the switching component is a thyristor.

4. A device according to claim 1, wherein the switching component is a transistor.

5. A device according to claim 1 wherein the dipole is a condensor which stores the variations in voltage of the switching component and applies them in the form of a negative potential to the input of the first stage of comparison.

6. A device according to claim 5, further comprising a resistor which is connected between a point in the switching circuit and the first dividing bridge.

7. A speed sensitive switching device for controlling the limiting speed of rotation of an engine, comprising a tachometric generator providing a voltage which is a function of the speed of the engine, a first comparator stage including a first voltage dividing bridge, said first comparator stage comparing the voltage supplied by the tachometric generator with a first reference voltage from said first dividing bridge, a second comparator stage including a second voltage dividing bridge, the second comparator comparing the output of the first comparator stage with the reference voltage derived from said dividing bridge, an ignition tranformer having its primary winding connected at one end to a supply voltage, a contact breaker connecting the other end of said primary winding to ground, the ignition transformer having a secondary winding across which a high voltage is developed to produce a spark when the contact breaker is opened, a resistor connected at one end to said one end of the primary of the ignition transformer a switching device operable by said second comparator stage for connecting said other end of said resistor to the other end of the primary of the ignition transformer and a capacitor connecting said other end of the resistor to the input of the first comparator stage.

\* \* \* \* \*